(12) United States Patent
Dong et al.

(10) Patent No.: US 10,705,760 B2
(45) Date of Patent: Jul. 7, 2020

(54) METHOD, DEVICE AND COMPUTER READABLE MEDIUM OF I/O MANAGEMENT

(71) Applicant: EMC IP Holding Company LLC, Hopkinton, MA (US)

(72) Inventors: Jibing Dong, Beijing (CN); Geng Han, Beijing (CN); Hongpo Gao, Beijing (CN); Jianbin Kang, Beijing (CN); Xinlei Xu, Beijing (CN); Lifeng Yang, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 35 days.

(21) Appl. No.: 16/222,036

(22) Filed: Dec. 17, 2018

(65) Prior Publication Data
US 2019/0332325 A1 Oct. 31, 2019

(30) Foreign Application Priority Data

Apr. 28, 2018 (CN) .......................... 2018 1 0400091

(51) Int. Cl.
| | |
|---|---|
| *G06F 12/00* | (2006.01) |
| *G06F 3/06* | (2006.01) |
| *G06F 12/0866* | (2016.01) |
| *G06F 12/0804* | (2016.01) |
| *G06F 12/0844* | (2016.01) |

(52) U.S. Cl.
CPC ............ *G06F 3/0659* (2013.01); *G06F 3/061* (2013.01); *G06F 3/0689* (2013.01); *G06F 12/0804* (2013.01); *G06F 12/0844* (2013.01); *G06F 12/0866* (2013.01); *G06F 2212/1016* (2013.01); *G06F 2212/262* (2013.01)

(58) Field of Classification Search
None
See application file for complete search history.

(56) References Cited

U.S. PATENT DOCUMENTS

| | | | |
|---|---|---|---|
| 5,615,335 A | 3/1997 | Onffroy et al. | |
| 7,454,567 B2 * | 11/2008 | Kazar | ...................... G06F 16/10 |
| | | | 711/114 |
| 7,653,832 B2 | 1/2010 | Faibish et al. | |
| 7,676,514 B2 | 3/2010 | Faibish et al. | |
| 7,721,144 B2 | 5/2010 | Brown et al. | |
| 7,945,726 B2 | 5/2011 | Faibish et al. | |
| 7,953,819 B2 | 5/2011 | Liang et al. | |
| 8,028,191 B2 | 9/2011 | Brown et al. | |
| 9,037,793 B1 * | 5/2015 | O'Brien, III | .......... G06F 3/0689 |
| | | | 711/114 |

(Continued)

*Primary Examiner* — John A Lane
(74) *Attorney, Agent, or Firm* — BainwoodHuang (57) ABSTRACT

Techniques perform I/O management. The techniques involve: in response to receiving an I/O request for a redundant array of independent disks (RAID), placing the I/O request in a corresponding waiting queue based on a stripe related to the I/O request in the RAID; and in response to the I/O request being granted to process, executing the I/O request based on storage of data of the stripe in a cache memory. Accordingly, by using the cache mechanism for the stripes, the I/O processing efficiency is improved and the user experience is enhanced. Moreover, the count of access to the RAID is reduced, the bandwidth for the backend access is saved and the system performance is improved.

20 Claims, 5 Drawing Sheets

(56) References Cited

U.S. PATENT DOCUMENTS

2007/0271350 A1* 11/2007 Kazar ................. G06F 16/10
709/214
2010/0180076 A1* 7/2010 Sundrani ............ G06F 11/1076
711/114
2019/0332287 A1* 10/2019 Sun ..................... G06F 3/0622

* cited by examiner

METHOD, DEVICE AND COMPUTER READABLE MEDIUM OF I/O MANAGEMENT

FIELD

Embodiments of the present disclosure relate to the computer field, and more specifically, to a method, device and computer-readable medium of an input/output (I/O) management of a redundant array of independent disks (RAID).

BACKGROUND

RAID is a data storage virtualization technology that combines multiple physical drive components (e.g., disks) into a single logical unit for the purposes of data redundancy, performance improvement, or both. Data is distributed across the physical drive components in one of several ways, referred to as RAID levels, depending on the required levels of redundancy and performance.

In order to improve a processing efficiency for I/O requests of a RAID, the I/O requests are usually processed in parallel. However, during the procedure of parallel processing, conflicts on disk access might exist because some I/O requests are for the same stripes in the RAID. It is expected that an improved solution is provided to perfect or optimize the processing performance of the I/O requests under such conflicts.

SUMMARY

According to example embodiments of the present disclosure, there is provided an improved solution for an I/O management.

According to a first aspect of the embodiments of the present disclosure, there is provided a method for I/O management. The method includes: in response to receiving an I/O request for a RAID, placing the I/O request in a corresponding waiting queue based on a stripe related to the I/O request in the RAID; and in response to the I/O request being granted to process, executing the I/O request based on storage of data of the stripe in a cache memory.

According to a second aspect of the embodiments of the present disclosure, there is provided an electronic device. The electronic device includes: a processing unit; and a memory storing instructions which, when executed by the processing unit, cause the electronic device to: in response to receiving an I/O request for a RAID, place the I/O request in a corresponding waiting queue based on a stripe related to the I/O request in the RAID; and in response to the I/O request being granted to process, execute the I/O request based on storage of data of the stripe in a cache memory.

According to a third aspect of the embodiments of the present disclosure, there is provided a computer-readable medium. The computer-readable medium has a computer program stored thereon which, when executed by a processor, implements the method according to the first aspect of the present disclosure.

In accordance with certain embodiments, (i) multiple waiting queues including the corresponding waiting queue and (ii) the cache memory reside within a data storage system that performs host I/O operations on behalf of a set of host computers. Additionally, placing the I/O request in the corresponding waiting queue based on the stripe related to the I/O request in the RAID includes transferring (or moving) the I/O request into the corresponding waiting queue of the multiple waiting queues residing within the data storage system. Furthermore, executing the I/O request based on storage of data of the stripe in the cache memory includes processing the I/O request in response to the I/O request being granted to process while the data storage system performs host I/O operations on behalf of the set of host computers.

It should be appreciated that the contents described in this Summary are not intended to identify key or essential features of the embodiments of the present disclosure, or to limit the scope of the present disclosure. Other features of the present disclosure will be understood more easily through the following description.

BRIEF DESCRIPTION OF THE DRAWINGS

Through the following detailed description with reference to the accompanying drawings, the above and other features, advantages and aspects of every embodiment of the present disclosure will become more apparent. In the drawings, same or similar reference signs indicate the same or similar elements, wherein.

DETAILED DESCRIPTION OF EMBODIMENTS

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Embodiments of the present disclosure will be described in more details with reference to the drawings. Although the drawings illustrate some embodiments of the present disclosure, it should be appreciated that the present disclosure can be implemented in various manners and should not be interpreted as being limited to the embodiments explained herein. On the contrary, the embodiments are provided to understand the present disclosure in a more thorough and complete way. It should be appreciated that drawings and embodiments of the present disclosure are only by way of example rather than restricting the protection scope of the present disclosure.

In the descriptions of the embodiments of the present disclosure, the term "includes" and its variants are to be read as open-ended terms that mean "includes, but is not limited to." The term "based on" is to be read as "based at least in part on." The terms "one embodiment" and "this embodiment" are to be read as "at least one embodiment." The following text also can include other explicit and implicit definitions. Moreover, the terms "I/O," "I/O request" and "I/O operation" can be used interchangeably in the description of the embodiments of the present disclosure for the sake of convenience.

Figure 1:
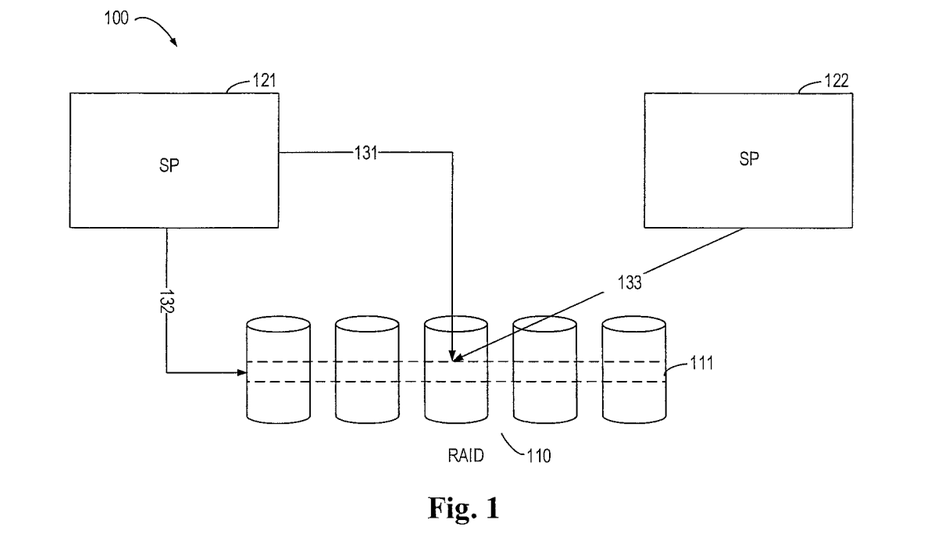
FIG. 1 illustrates a schematic diagram of an example scenario in which embodiments of the present disclosure can be implemented.

FIG. 1 illustrates a schematic diagram 100 of an example scenario in which embodiments of the present disclosure can be implemented. As shown in FIG. 1, RAID 110 can serve dual storage processors (SP) 121 and 122. The dual SP architecture means simultaneously processing parallel I/O operations for the same RAID group or the same stripe range (e.g., stripe 111 indicated by dotted line) on the two SPs. It should be noted that the context of the description takes the architecture consisting of two SPs as an example for explanation. However, RAID 110 can serve, in fact, less or more SPs and the present application is not restricted in this regard. SP can be the storage server or the storage terminal per se or a part thereof.

Figure 2:
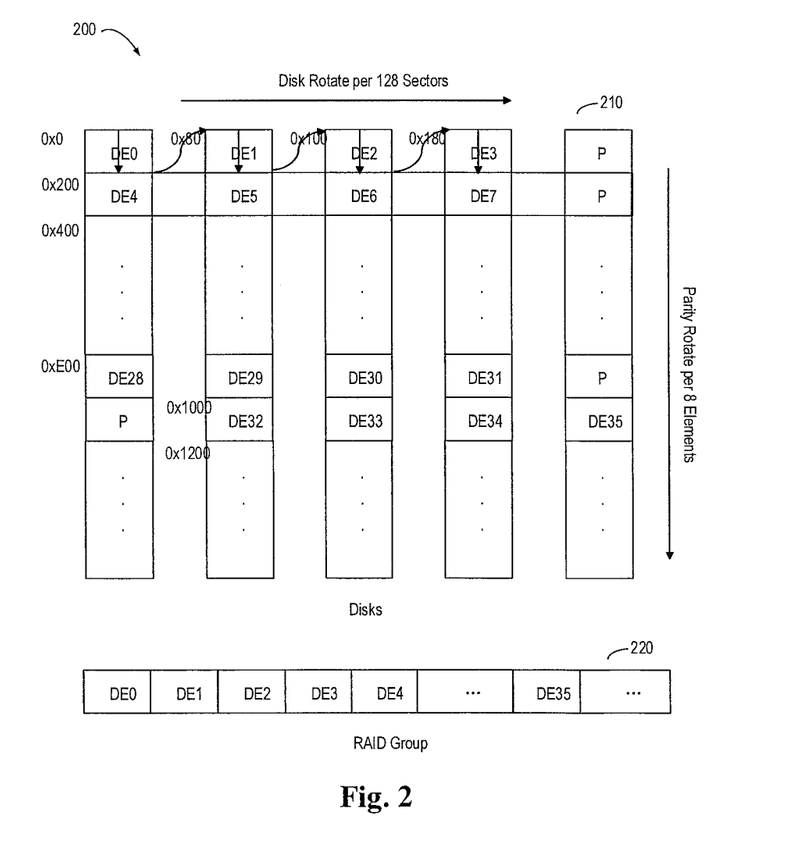
FIG. 2 illustrates a schematic diagram of data distribution in an RAID where embodiments of the present disclosure can be implemented.

FIG. 2 illustrates a schematic diagram 200 of data distribution in an RAID where embodiments of the present disclosure can be implemented. As an example, the situation in 4+1 RAID5 is illustrated here. An upper portion of FIG. 2 shows physical distribution 210 of the data on individual disks and these disks constitute a RAID group. Each disk in the RAID group is divided into a set of fixed-size disk elements (DEs). Each element usually contains 128 sectors, each sector being 64K bytes. Disk elements that have the same logical block address (LBA) and come from different disks, e.g., DE0, DE1, DE2, DE3 and a parity check bit P shown in FIG. 2, will form a stripe (such as the stripe 111 of FIG. 1). In this stripe, one element is parity check bit and the rest elements are data. The lower portion of FIG. 2 shows logic distribution 220 of the RAID group. As mentioned above, the RAID technique combines a plurality of disk components into a single logic unit to provide storage service. It should be appreciated that the present application is not restricted to the shown RAID 5 and can be suitable for other already known or to be developed RAID of any types or similar storage arrays.

Now return to FIG. 1. The SPs 121 and 122 must maintain some synchronization on the commonly accessed stripe 111 of RAID 110, to prevent I/O operations of the SPs 121 and 122 from messing up user data. For example, a mechanism for grant to process, such as stripe lock, can be introduced to strictly control the processing for I/O operations from the two SPs 121 and 121 in sequence. Any of the I/O operations from one of the SPs can access the RAID (indicated by 132 of FIG. 1) only after a stripe lock is acquired locally or from a further SP peer (e.g., indicated by 131 or 133 of FIG. 1).

Figure 3:
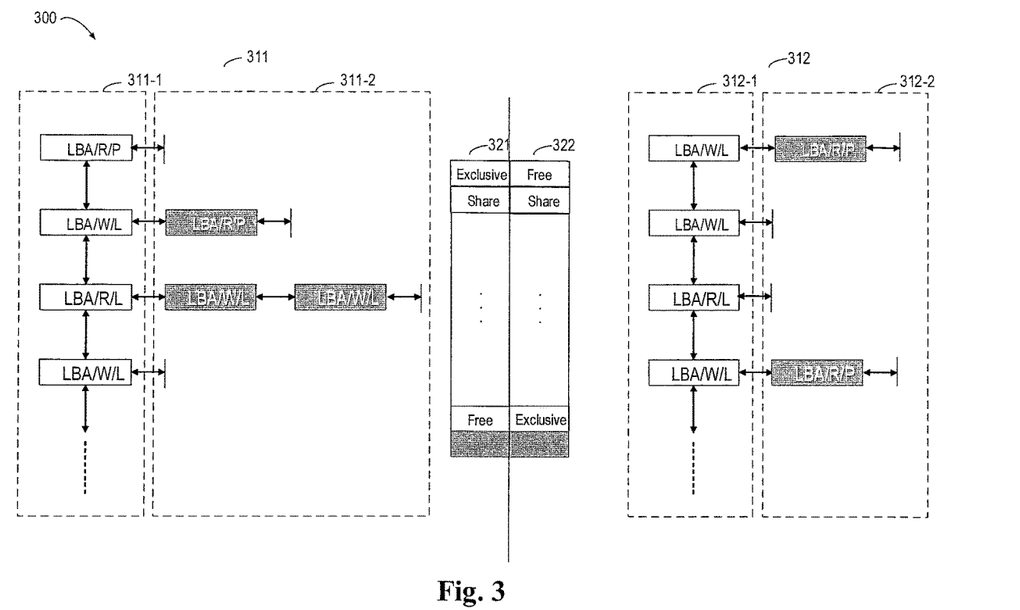
FIG. 3 illustrates a schematic diagram of a stripe lock mechanism in which embodiments of the present disclosure can be implemented.

When the I/O operations are finished, corresponding stripe locks will be released. FIG. 3 illustrates a schematic diagram 300 of a stripe lock mechanism in which embodiments of the present disclosure can be implemented.

As shown in FIG. 3, the stripe lock mechanism includes stripe lock chains 311 and 312 and stripe lock caches 321 and 322 respectively for SPs 121 and 122. The stripe lock chains 311 and 312 represent local SP's permission for a current I/O operation. The stripe lock chain 311 can further consist of a main chain 311-1 and a waiting chain 311-2, and the stripe lock chain 312 can further consist of a main chain 312-1 and a waiting chain 312-2. The chain lock caches 321 and 322 represent peer SP's permission for the current JO operation. To acquire the stripe lock, it is required that a local stripe lock is first checked to ensure that the I/O operation is permitted by the local SP, and then it is checked whether the I/O operation is permitted by the peer SP based on the stripe lock cache.

According to embodiments of the present disclosure, the I/O request from the local SP (e.g., SP 121) can be placed, based on the stripe range for the I/O request, in a main chain (e.g., 311-1) or a waiting chain (e.g., 311-2) of the stripe lock chain (e.g., 311). According to embodiments of the present disclosure, the I/O request can include a LBA range and a type and source of the request, and for example can be represented as LBA start position+length/operation type/source. The LBA range indicates an LBA range of a requested read/write operation. The operation type denotes whether a read operation (R) or a write operation (W) is requested. The source represents whether the I/O request comes from the local SP (L) or a peer SP (P). According to embodiments of the present disclosure, if the current I/O request has access conflicts with none of the previous I/O requests in the main chain, i.e., the LBA range for the current I/O request does not overlap with any of the previous I/O requests in the main chain, the current I/O request will be placed (or put) in the main chain. The I/O requests in the main chain can be processed in parallel. If the current I/O request has access conflicts with all previous I/O requests in the main chain, i.e., the LBA range for the current I/O request overlaps with a certain previous I/O request in the main chain, the current I/O request will be placed in a waiting chain corresponding to the previous I/O request that has access conflicts with the current I/O request. The current I/O request will be executed when the previous I/O request in the waiting chain is completed.

Afterwards, it is checked whether the I/O request is permitted by the peer SP or not based on the stripe lock cache. As shown in FIG. 3, the stripe lock caches 321 and 322 can contain three indications, i.e., exclusive, shared and free. "Exclusive" means that the stripe lock is exclusive for use by the local SP, so the local I/O request is permitted for execution. "Shared" denotes that the local SP and the peer SP can share the stripe lock, so the local I/O request is permitted for execution. "Free" demonstrates that a message including the I/O request information needs to be sent to the peer SP to ask permission for processing of the I/O request. Specifically, the peer SP (e.g., SP 122) can determine, based on the information in the I/O request, whether the I/O request is placed in (e.g., moved to or transferred to) the main chain or the waiting chain (such as 312-1 or 312-2) by comparing the I/O request with other local I/O requests, so as to determine when the execution of the I/O request is granted. When the local SP (e.g., SP 121) receives a grant for the I/O request from the peer SP, the I/O request is executed.

Figure 4:
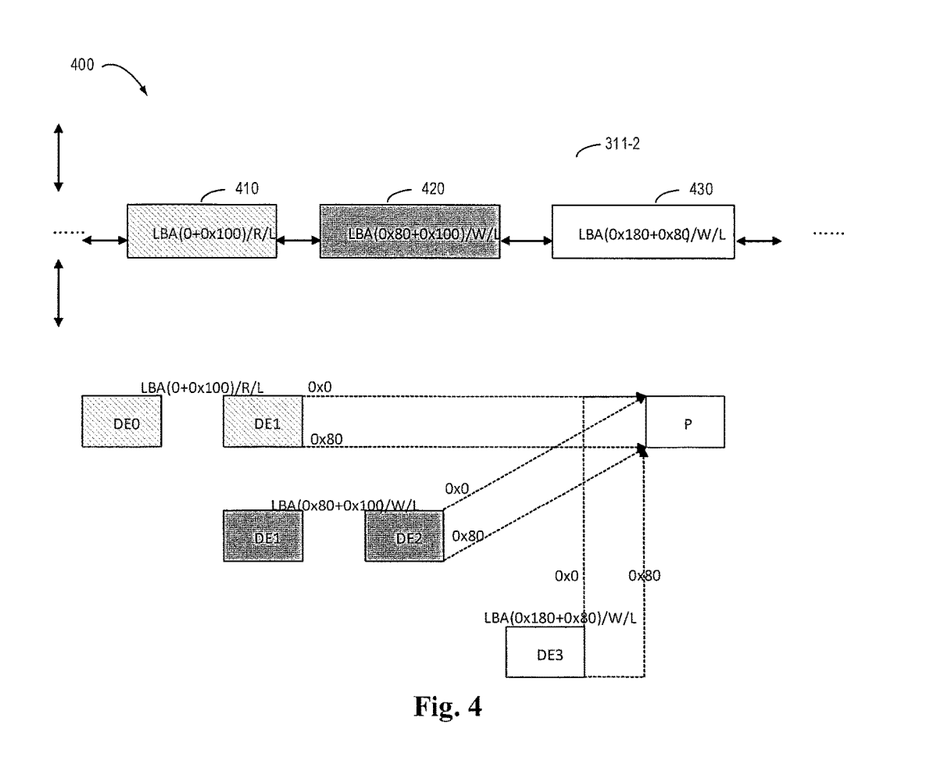
FIG. 4 illustrates a schematic diagram of I/O conflicts in a waiting chain where embodiments of the present disclosure can be implemented.

FIG. 4 illustrates a schematic diagram 400 of I/O conflicts in a waiting chain where embodiments of the present disclosure can be implemented. The following text continues to use the above example and explains by taking the waiting queue LBA/R/L, LBA/W/L and LBA/W/L in the waiting chain 311-2 of FIG. 3 as examples. It is assumed that I/O requests of the waiting queues are respectively indicated by 410, 420 and 430 in FIG. 4. The I/O request 410 is LBA(0+0x100)/R/L, which indicates a read request from the local SP (e.g., SP 121 of FIG. 1) starting from a logical block address 0 and having a block count of 100. The I/O request 420 is LBA(0x80+0x100)/W/L, which indicates a write request from the local SP (e.g., SP121 of FIG. 1) starting from a logical block address 0x80 and having a block count of 100. The I/O request 430 is LBA(0x180+0x80)/W/L, which is a write request from the local SP (e.g., SP121 of FIG. 1) starting from a logical block address 0x180 and having a block count of 80. With reference to FIG. 2, it is known that I/O requests 410, 420 and 430 access the same stripe, i.e., DE0, DE1, DE2, DE3 and P. Therefore, these I/O requests need to be processed one by one.

Regarding the above example, the inventor conducts a research on the count of access to the RAID respectively in an optimal I/O performance situation where all disks are available and in a degraded I/O performance situation where one or more disks are unavailable. For example, it is required that DE0 and DE1 are read from the RAID (e.g., RAID 110 of FIG. 1) for the I/O request 410, so the read count is 2 and the write count is 0. It is required that DE1, DE2 and P are pre-read from the RAID for the I/O request 420. Afterwards, a new parity check bit is generated based on the XOR operations of these data and data to be written, and then the data to be written and the new parity check bit are written into the RAID. Therefore, the read count is 3 and the write count is 3. It is required that DE3 and P are pre-read from the RAID for the I/O request 430, and then a new parity check bit is generated based on the XOR operations of these data and data to be written. Subsequently, the data to be written and the new parity check bit are written into the RAID. Thus, the read count is 2 and the write count is 2. The following Table I exhibits the count of access to the RAID in an optimal I/O performance situation. According to Table I, the disks are accessed 12 times in the optimal I/O performance situation.

TABLE I

| I/O Request | Read Count | Write Count | Total Access Count |
|---|---|---|---|
| LBA(0 + 0 × 100)/R/L | 2 | 0 | 2 |
| LBA(0 × 80 + 0 × 100)/W/L | 3 | 3 | 6 |
| LBA(0 × 180 + 0 × 80)/W/L | 2 | 2 | 4 |
| Total | 7 | 5 | 12 |

In terms of the degraded I/O performance situation, it is assumed that there is a disk fault at the DE1. In such case, for example, it is required that DE0, DE2, DE3 and P are pre-read from the RAID (RAID 110 of FIG. 1) for the I/O request 410, to generate the DE1 through XOR operations of these data. Therefore, the read count is 4 and the write count is 0. It is required that DE0, DE2, DE3 and P are pre-read from the RAID for the I/O request 420, to generate the DE1 through XOR operations of these data. Afterwards, a new parity check bit is generated based on the XOR operations of the generated DE1, DE2 and P and the new DE1 and DE2 to be written, and then the new DE2 and the new parity check bit are written into the RAID. Therefore, the read count is 4 and the write count is 2. It is required that DE3 and P are pre-read from the RAID for the I/O request 430. Afterwards, a new parity check bit is generated based on XOR operations of these data and data to be written, and then the data to be written and the new parity check bit is written into the RAID. Therefore, the read count is 2 and the write count is 2. The following Table II exhibits the count of access to the RAID in the degraded I/O performance situation. According to Table II, the disk is accessed 14 times in the degraded I/O performance situation.

TABLE II

| I/O Request | Read Count | Write Count | Total Access Count |
|---|---|---|---|
| LBA(0 + 0 × 100)/R/L | 4 | 0 | 4 |
| LBA(0 × 80 + 0 × 100)/W/L | 4 | 2 | 6 |
| LBA(0 × 180 + 0 × 80)/W/L | 2 | 2 | 4 |
| Total | 10 | 4 | 14 |

The inventor noticed that some data or parity check bits might in fact be repeatedly read because the data accessed by the I/O requests in the waiting queues usually overlap with each other. Therefore, it occurs to the inventor that I/O processing can be accelerated by avoiding the repeat read as much as possible, so as to enhance I/O performance. Besides, the backend access bandwidth can be saved by reducing the count of disk read.

The basic concept of the present application is providing a stripe cache mechanism, such that stripe data in conflict is cached in a cache memory for use in the I/O processing, thereby reducing access to the backend disks. This concept will be explained in details below with reference to FIGS. 5 to 7.

Figure 5:
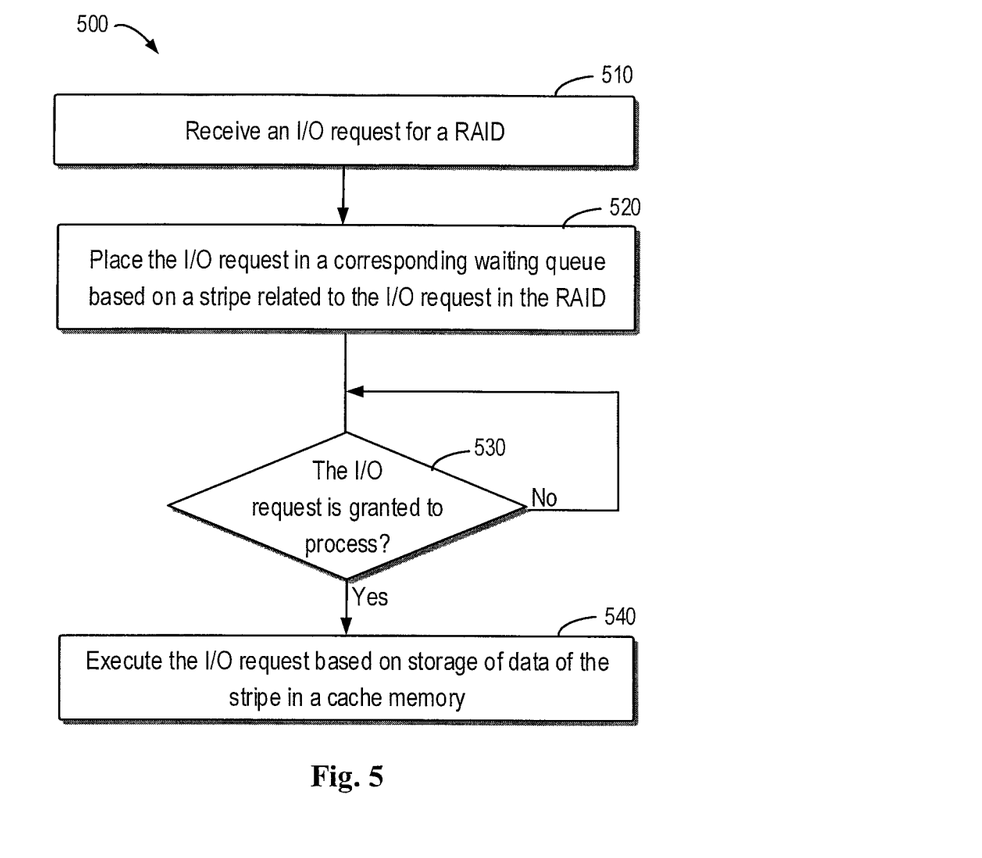
FIG. 5 illustrates a flowchart of a method for processing I/O requests according to one embodiment of the present disclosure.

FIG. 5 illustrates a flowchart of a method 500 for processing I/O requests according to one embodiment of the present disclosure. The method 500 can be implemented, for example, at the SP 121 or 122 of FIG. 1. It should be understood that the method 500 can be implemented at any storage servers or storage terminals including the SP 121 or 122 of FIG. 1.

As shown in FIG. 5, an I/O request for the RAID is received at block 510. For example, the I/O request for the RAID 110 from a user can be received via the SP 121 or 122 of FIG. 1. According to embodiments of the present disclosure, the I/O request at least can include the LBA range and the type and source of the request. Other details can refer to the above related description with reference to FIG. 3.

At block 520, an I/O request is placed in a corresponding waiting queue based on stripes in the RAID related to the I/O request. According to embodiments of the present disclosure, the stripes in the RAID for the I/O request can be determined based on the LBA range included in the I/O request. For example, the stripes in the RAID related to the I/O request can be determined based on mapping from a logical address to a physical address and correspondence between the physical address and stripes. According to embodiments of the present disclosure, if stripe ranges do not overlap based on comparison of the stripe ranges between the I/O request and all local previous I/O requests, the I/O request will be placed in a main chain for parallel processing, and if the stripe range of the I/O request overlaps with that of a certain previous I/O request, the I/O request will be placed in a waiting chain corresponding to the previous I/O request. Accordingly, the I/O request is placed in the corresponding waiting queue. Processing of this step is similar to the above related description with reference to FIG. 3.

At block 530, it is determined whether the I/O request is granted to process. According to embodiments of the present disclosure, I/O requests in a waiting queue are processed in sequence for each waiting queue. According to embodiments of the present disclosure, the I/O request, after acquiring the stripe lock, can be permitted for execution. Please refer to the above related description with reference to FIG. 3 for the acquisition of the stripe lock, which will not be repeated here. It should be appreciated that processing of the I/O request can be granted through any suitable manners and the present application is not restricted in this regard. If it is determined that the I/O request is granted to process at block 530, the method proceeds to block 540.

At block 540, the I/O request is executed based on the storage of data in the stripes related to the I/O request in the cache memory. This step reflects basic inventive points of the concept. In the prior art, the processing of the I/O request is completed by directly accessing the RAID. However, in the embodiments of the present disclosure, data in the stripes are pre-cached through stripe overlap in a plurality of I/O requests of the waiting queues, such that the I/O requests can be executed based on the cached data without accessing the RAID or reducing access to the RAID. More detailed explanations will be provided below with reference to FIGS. 6 and 7.

Figure 6:
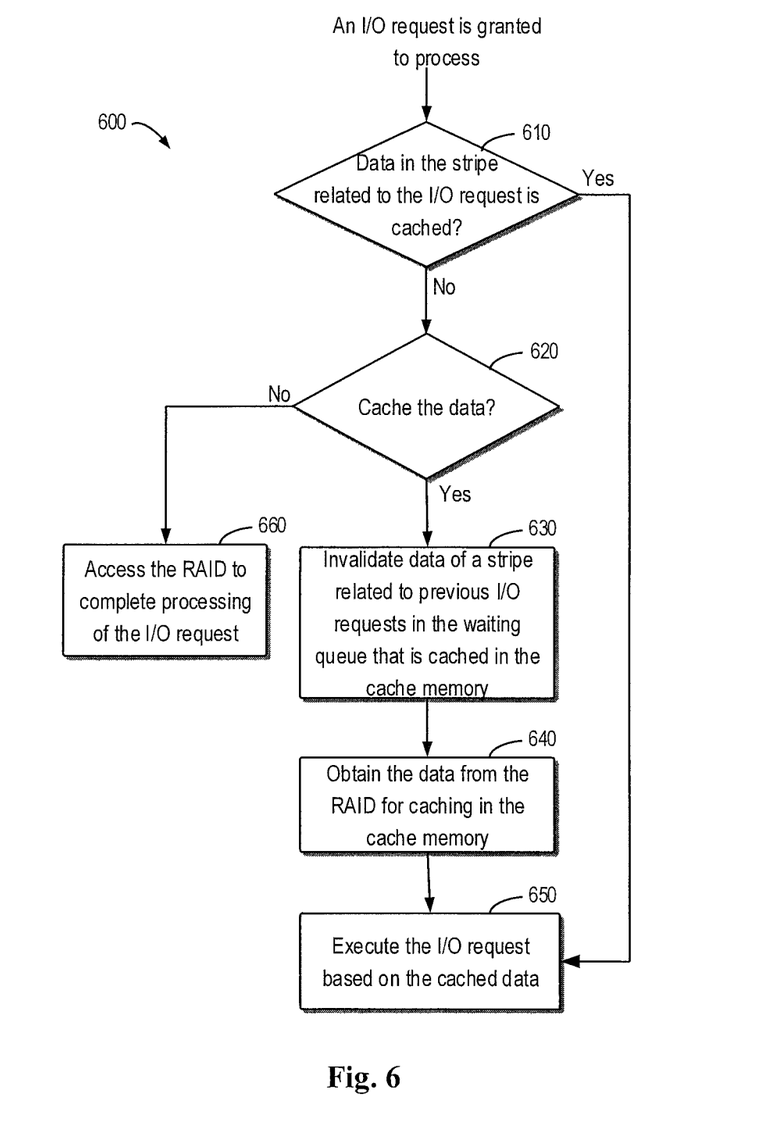
FIG. 6 illustrates a flowchart of a method for processing I/O requests according to a further embodiment of the present disclosure.

FIG. 6 illustrates a flowchart of a method 600 for processing I/O requests according to a further embodiment of the present disclosure. Similarly, the method 600 can be implemented, for example, at the SP 121 or 122 of FIG. 1 and can be implemented in fact at any storage servers or storage terminals including the SP 121 of 122 of FIG. 1. The method 600 describes embodiments about how to execute the I/O requests after the I/O request is granted to process.

As shown in FIG. 6, it is determined whether data in stripes related to the I/O request is cached in a cache memory at block 610. According to embodiments of the present disclosure, in response to the I/O request being marked as cache-enabled, it is determined that the data has been cached. In a further embodiment, in response to the I/O request being marked as cache-disabled, it is determined that the data is not cached. It should be understood that the data can be determined as cached or not through any other suitable manners and the present application is not restricted to the above listed manners. For the sake of simplicity, the manners will not be enumerated here.

When it is determined that the data has been cached at 610, the I/O request is executed based on the cached data at block 650. The following text continues to use the above example with reference to FIG. 4. Assuming that the I/O request 410 has been granted to process and data DE0, DE1, DE2, DE3 and P in the stripes related to the I/O request 410 have been cached in the cache memory, corresponding data can be directly read from the stored DE0 and DE1 in the cache memory to complete the read operation of the I/O request 410 without accessing the RAID. Accordingly, the count of access to the disks is reduced, the backend access bandwidth is saved, the I/O processing speed is accelerated and the I/O performance is improved.

Figure 7:
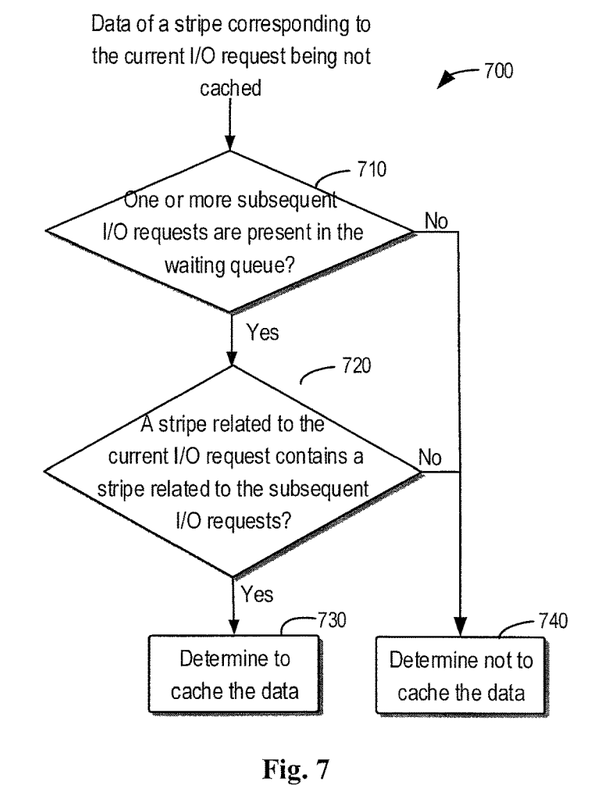
FIG. 7 illustrates a flowchart of a method for determining whether to cache the data according to embodiments of the present disclosure.

When it is determined that the data is not cached at 610, the method proceeds to block 620. At block 620, it is determined whether the data is cached or not. According to embodiments of the present disclosure, as long as the count of access to the RAID by subsequent I/O requests can be reduced on the assumption that the data in the stripes related to the current I/O request is cached, it is determined that the data is cached; otherwise, it is determined that the data is not cached. More specific embodiments will be described below with reference to FIG. 7. FIG. 7 illustrates a flowchart of a method 700 for determining whether to cache the data according to embodiments of the present disclosure.

As shown in FIG. 7, it is determined whether one or more subsequent I/O requests exist in a waiting queue at block 710. The subsequent I/O requests refer to I/O requests queuing behind the current I/O request in the waiting queue. The following text continues to use the above example with reference to FIG. 4. Assuming the I/O request 410 is currently granted to process, it can be determined that at least two of the subsequent I/O requests 420 and 430 exist in the waiting queue.

When it is determined that there are the subsequent I/O requests in the waiting queue at block 710, the method proceeds to block 720. At block 720, it is determined whether the stripes related to the current I/O request contain stripes related to these subsequent I/O requests. According to one embodiment of the present disclosure, in response to the stripes related to the current I/O request fully overlapping with the stripes related to at least one of the subsequent I/O requests, it is determined that the stripes related to the current I/O request contain the stripes related to the subsequent I/O requests; otherwise, it is determined that the stripes related to the current I/O request do not contain the stripes related to the subsequent I/O requests.

The following text continues to use the above example with reference to FIG. 4 and it is assumed that the I/O request 410 is currently granted to process. The stripes related to the I/O request 410 are the stripe consisting of DE0, DE1, DE2, DE3 and P. The subsequent I/O requests 420 and 430 also involve this stripe. Therefore, the stripes related to the I/O request 410 fully overlap with the stripes related to the subsequent I/O requests 420 and 430. In this case, it is determined that data in these stripes are cached, which certainly can reduce the count of access to the RAID by the subsequent I/O requests 420 and 430.

With reference to FIG. 7, when it is determined that the stripes related to the current I/O request contain the stripes related to these subsequent I/O requests at block 720, the method proceeds to block 730, at which it is determined that data in the stripes related to the current I/O request is cached. According to embodiments of the present disclosure, in response to determining to cache the data, the one or more subsequent I/O requests in the waiting queue related to the I/O request can be marked as cache-enabled. In one embodiment, the subsequent I/O requests identical to stripe data related to the current I/O request are marked as cache-enabled. In a further embodiment, the subsequent I/O requests different from the current I/O request in the involved stripe data are marked as cache-disabled. Accordingly, the above facilitates processing of the subsequent I/O requests, so as to improve the I/O processing performance.

When it is determined at block 710 that the one or more subsequent I/O requests do not present in the waiting queue, i.e., only the current I/O request is present in the waiting queue, the method proceeds to block 740, at which it is determined that the data in the stripes related to the current I/O request is not cached.

It should be understood that it can be determined by any other suitable ways whether the data in the stripes related to the current I/O request is cached, and the present application is not restricted to the examples illustrated here.

Now the method returns to FIG. 6. According to embodiments of the present disclosure, when it is determined that the data in the stripes related to the current I/O request is cached at block 620, the method proceeds to block 630. At block 630, data in stripes related to the previous I/O requests in the waiting queue cached in the cache memory are invalidated. According to embodiments of the present disclosure, cache of the stripe data corresponding to the waiting queue is invalidated to release the cache space, so as to effectively manage and utilize the cache space and improve the overall system performance.

It should be appreciated that processing of block 630 is optional. According to other embodiments of the present disclosure, when it is determined at block 620 that the data in the stripes related to the I/O request is cached, the method can directly proceed to block 640. At block 640, the data in the stripes related to the I/O request is obtained from the RAID to be cached in the cache memory. For example, all of the data of the stripe 111 can be read from individual disks of the RAID 110 of FIG. 1, and the read data is cached in the cache memory for use in the processing of the subsequent I/O requests.

At block 650, the I/O request is executed based on the cached data. According to one embodiment of the present disclosure, in the case that there is no fault in disks of the RAID, in response to the I/O request being a read operation, the read operation can be completed based on the cached data without the access for the RAID. According to a further embodiment of the present disclosure, in the case that a disk of the RAID breaks down, in response to the I/O request being a read operation, a pre-read for data can be completed based on the cached data to obtain data on the faulted disk through computation. According to a further embodiment of the present disclosure, in response to the I/O request being a write operation, a pre-read for data can be completed based on the cached data and then a write for data is executed by accessing the RAID, thereby reducing the count of access to the RAID.

It should be understood that although embodiments are described here by taking the RAID5 with parity check function or similar arrays as examples, the present application is not restricted to this. The present application is also suitable for a RAID0 without parity check function or similar arrays. In this case, at least the count of access to the RAID in the situation of read requests can be reduced, so as to improve the overall I/O performance.

Additionally, according to embodiments of the present disclosure, the data in the cache memory can be updated based on the write operation, to facilitate use in the processing of the subsequent I/O requests. Therefore, precision of the I/O processing is guaranteed.

Additionally, according to embodiments of the present disclosure, in response to the current I/O request being the last I/O request with cache-enabled in the waiting queue, the cached data can be invalidated to release the related cache space, so as to effectively manage and utilize the cache space and improve the overall system performance.

As shown in FIG. 6, when it is determined at block 620 that the data in the stripes related to the I/O request is not cached, the method proceeds to block 660, at which the RAID is accessed to complete the processing of the I/O request. According to embodiments of the present disclosure, as long as the count of access to the RAID by the subsequent I/O requests cannot be reduced on the assumption that the data in the stripes related to the current I/O request is cached, the RAID is directly accessed following the prior art to complete the processing of the I/O request. The processing of this step can refer to the description with reference to FIG. 3 and FIG. 4 and will not be repeated here.

The following text continues to use the above example with reference to FIG. 4 and the inventor also studies the count of access to the RAID when the I/O requests 410-430 are processed by the method according to embodiments of the present disclosure. The following Table III and Table IV respectively exhibit the count of access to RAID in the optimal I/O performance situation and the degraded I/O performance situation according to embodiments of the present disclosure.

TABLE III

| I/O Request | Read Count | Write Count | Total Access Count |
|---|---|---|---|
| Cache Prefetch | 5 | 0 | 5 |
| LBA(0 + 0 × 100)/R/L | 0 | 0 | 0 |
| LBA(0 × 80 + 0 × 100)/W/L | 0 | 3 | 3 |
| LBA(0 × 180 + 0 × 80)/W/L | 0 | 2 | 2 |
| Total | 5 | 5 | 10 |

It is seen from Table III that the disk is accessed 10 times in the optimal I/O performance situation. Compared with Table I, the count of disk access is reduced.

TABLE IV

| I/O Request | Read Count | Write Count | Total Access Count |
|---|---|---|---|
| Cache Prefetch | 4 | 0 | 4 |
| LBA(0 + 0 × 100)/R/L | 0 | 0 | 0 |
| LBA(0 × 80 + 0 × 100)/W/L | 0 | 2 | 2 |
| LBA(0 × 180 + 0 × 80)/W/L | 0 | 2 | 2 |
| Total | 4 | 4 | 8 |

From Table IV, the disk is accessed 8 times in the degraded I/O performance situation according to embodiments of the present disclosure. Compared with Table II, the count of disk access is reduced. Therefore, there is no need for rebuilding the degraded data repeatedly especially in the degraded I/O performance situation. Thus, the I/O processing performance is significantly improved.

It should be understood that although the above analysis is made based on the case of the RAID5, it is only an example. In fact, the disclosed contents of the present application are suitable for other cases of the RAID or similar arrays.

According to embodiments described with reference to FIGS. 5 to 7, the I/O processing performance can be improved and the user experience can be enhanced using a cache mechanism for the stripes. Moreover, the count of access to RAID is reduced, the bandwidth for backend access is saved and the system performance is improved.

Figure 8:
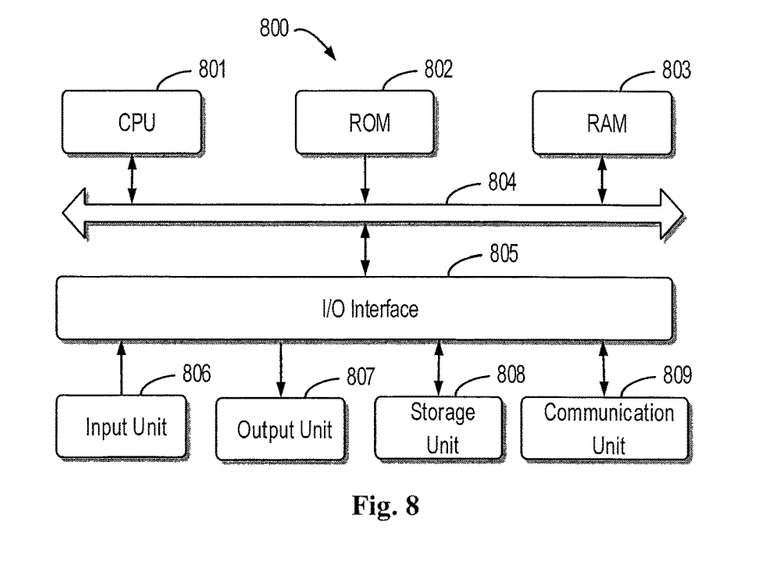
FIG. 8 illustrates a block diagram of an electronic device for implementing embodiments of the present disclosure.

FIG. 8 illustrates a schematic block diagram of an example computing device 800 for implementing embodiments of the present disclosure. The device 800 can perform the method with reference to FIGS. 5 to 7. As shown, the device 800 includes a central process unit (CPU) 801, which can execute various suitable actions and processing based on the computer program instructions stored in the read-only memory (ROM) 802 or computer program instructions loaded in the random-access memory (RAM) 803 from a storage unit 808. The RAM 803 can also store all kinds of programs and data required by the operations of the device 800. CPU 801, ROM 802 and RAM 803 are connected to each other via a bus 804. The input/output (I/O) interface 805 is also connected to the bus 804.

A plurality of components in the device 800 is connected to the I/O interface 805, including: an input unit 806, such as keyboard, mouse and the like; an output unit 807, e.g., various kinds of display and loudspeakers etc.; a storage unit 808, such as memory and optical disk etc.; and a communication unit 809, such as network card, modem, wireless transceiver and the like. The communication unit 809 allows the device 800 to exchange information/data with other devices via the computer network, such as Internet, and/or various telecommunication networks.

The processing unit 801 executes the above described each method and processing, such as methods 500-700. For example, in some embodiments, the methods 500-700 can be implemented as computer software program tangibly included in the machine-readable medium, e.g., storage unit 808. In some embodiments, the computer program can be partially or fully loaded and/or mounted to the device 800 via ROM 802 and/or communication unit 809. When the computer program is loaded to RAM 803 and executed by the CPU 801, one or more steps of the above described methods 500-700 can be implemented. Alternatively, in other embodiments, the CPU 801 can be configured via any other suitable ways (e.g., by means of firmware) to execute the methods 500-700.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a peer machine or entirely on the peer machine or server.

In the context of this disclosure, a machine readable medium may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, although operations are depicted in a particular order, it should be understood that the operations are required to be executed in the shown particular order or in a sequential order, or all shown operations are required to be executed to achieve the expected results. In certain circumstances, multitasking and parallel processing may be advantageous. Likewise, while several specific implementation details are contained in the above discussions, these should not be construed as limitations on the scope of the subject matter described herein. Certain features that are described in the context of separate implementations may also be implemented in combination in a single implementation. Conversely, various features that are described in the context of a single implementation may also be implemented in multiple implementations separately or in any suitable subcombination.

Although the subject matter has been described in language specific to structural features and/or methodological acts, it is to be understood that the subject matter specified in the appended claims is not necessarily limited to the specific features or acts described above. Rather, the specific features and acts described above are disclosed as example forms of implementing the claims.

We claim:

1. A method of input/output (I/O) management, comprising:
   in response to receiving an I/O request for a redundant array of independent disks (RAID), placing the I/O request in a corresponding waiting queue based on a stripe related to the I/O request in the RAID; and
   in response to the I/O request being granted to process, executing the I/O request based on storage of data of the stripe in a cache memory.

2. The method of claim 1, wherein executing the I/O request comprises:
   determining whether the data has been cached in the cache memory; and
   in response to determining that the data has been cached, executing the I/O request based on the cached data.

3. The method of claim 2, wherein executing the I/O request further comprises:
   in response to determining that the data has not been cached, determining whether to cache the data;
   in response to determining not to cache the data, accessing the RAID to complete the processing of the I/O request; and
   in response to determining to cache the data,
   obtaining the data from the RAID for caching in the cache memory, and executing the I/O request based on the cached data.

4. The method of claim 3, further comprising:
   in response to determining to cache the data, invalidating, prior to obtaining the data from the RAID for caching in the cache memory, data of a stripe related to previous I/O requests in the waiting queue that is cached in the cache memory.

5. The method of claim 3, further comprising:
   in response to determining to cache the data, marking one or more subsequent I/O requests in the waiting queue related to the I/O request as cache-enabled.

6. The method of claim 3, wherein determining whether to cache the data comprises:
   in response to determining that one or more subsequent I/O requests are present in the waiting queue, determining whether the stripe related to the I/O request comprises a stripe related to the one or more subsequent I/O requests; and
   in response to determining that the stripe related to the I/O request comprises the stripe related to the one or more subsequent I/O requests, determining to cache the data.

7. The method of claim 3, wherein determining whether to cache the data comprises:
   in response to determining that the waiting queue comprises the I/O request only, determining not to cache the data.

8. The method of claim 1, wherein executing the I/O request comprises:

in response to the I/O request being a read operation, executing the read operation based on the cached data without accessing the RAID; and in response to the I/O request being a write operation, accessing the RAID to execute the write operation, and updating data in the cache memory based on the write operation.

9. The method of claim 2, wherein determining whether the data is cached comprises:

in response to the I/O request being marked as cache-enabled, determining that the data has been cached.

10. An electronic device, comprising:

a processing unit; and a memory storing instructions which, when executed by the processing unit, cause the electronic device to:

in response to receiving an input/output (I/O) request for a redundant array of independent disks (RAID), place the I/O request in a corresponding waiting queue based on a stripe related to the I/O request in the RAID; and in response to the I/O request being granted to process, execute the I/O request based on storage of data of the stripe in a cache memory.

11. The device of claim 10, wherein the memory further stores instructions which, when executed by the processing unit, cause the electronic device to:

determine whether the data has been cached in the cache memory or not; and in response to determining that the data has been cached, execute the I/O request based on the cached data.

12. The device of claim 11, wherein the memory further stores instructions which, when executed by the processing unit, cause the electronic device to:

in response to determining that the data has not been cached, determine whether to cache the data;

in response to determining not to cache the data, access the RAID to complete the processing of the I/O request; and in response to determining to cache the data, obtain the data from the RAID for caching in the cache memory, and execute the I/O request based on the cached data.

13. The device of claim 12, wherein the memory further stores instructions which, when executed by the processing unit, cause the electronic device to:

in response to the I/O request being a read operation, execute the read operation based on the cached data without accessing the RAID; and in response to the I/O request being a write operation, access the RAID to execute the write operation, and update data in the cache memory based on the write operation.

14. The device of claim 12, wherein the memory further stores instructions which, when executed by the processing unit, cause the electronic device to:

in response to determining to cache the data, invalidate, prior to obtaining the data from the RAID for caching in the cache memory, data of a stripe related to previous I/O requests in the waiting queue that is cached in the cache memory.

15. The device of claim 12, wherein the memory further stores instructions which, when executed by the processing unit, cause the electronic device to:

in response to determining to cache the data, mark one or more subsequent I/O requests in the waiting queue related to the I/O request as cache-enabled.

16. The device of claim 12, wherein the memory further stores instructions which, when executed by the processing unit, cause the electronic device to:

in response to determining that one or more subsequent I/O requests are present in the waiting queue, determine whether the stripe related to the I/O request comprises a stripe related to the one or more subsequent I/O requests; and in response to determining that the stripe related to the I/O request comprises the stripe related to the one or more subsequent I/O requests, determine to cache the data.

17. The device of claim 12, wherein the memory further stores instructions which, when executed by the processing unit, cause the electronic device to:

in response to determining that the waiting queue comprises the I/O request only, determine not to cache the data.

18. The device of claim 11, wherein the memory further stores instructions which, when executed by the processing unit, cause the electronic device to:

in response to the I/O request being marked as cache-enabled, determine that the data has been cached.

19. A computer program product having a non-transitory computer readable medium which stores a set of instructions for input/output (I/O) management; the set of instructions, when carried out by computerized circuitry, causing the computerized circuitry to perform a method of:

in response to receiving an I/O request for a redundant array of independent disks (RAID), placing the I/O request in a corresponding waiting queue based on a stripe related to the I/O request in the RAID; and in response to the I/O request being granted to process, executing the I/O request based on storage of data of the stripe in a cache memory.

20. The computer program product of claim 19 wherein (i) multiple waiting queues including the corresponding waiting queue and (ii) the cache memory reside within a data storage system that performs host input/output (I/O) operations on behalf of a set of host computers;

wherein placing the I/O request in the corresponding waiting queue based on the stripe related to the I/O request in the RAID includes:

transferring the I/O request into the corresponding waiting queue of the multiple waiting queues residing within the data storage system; and wherein executing the I/O request based on storage of data of the stripe in the cache memory includes:

processing the I/O request in response to the I/O request being granted to process while the data storage system performs host I/O operations on behalf of the set of host computers.

* * * * *